US010531424B1

United States Patent
Lee

(10) Patent No.: US 10,531,424 B1
(45) Date of Patent: Jan. 7, 2020

(54) ANGLE OF ARRIVAL AND DEPARTURE USING STANDARD BLUETOOTH LOW ENERGY PACKETS

(71) Applicant: GREINA TECHNOLOGIES, INC, Salt Lake City, UT (US)

(72) Inventor: Daniel Joseph Lee, Salt Lake City, UT (US)

(73) Assignee: Greina Technologies, Inc., Salt Lake City, UT (US)

( * ) Notice: Subject to any disclaimer, the term of this patent is extended or adjusted under 35 U.S.C. 154(b) by 0 days.

(21) Appl. No.: 16/128,126

(22) Filed: Sep. 11, 2018

(51) Int. Cl.
*H04W 64/00* (2009.01)
*H04W 4/80* (2018.01)
*G01S 11/04* (2006.01)
*G01S 3/48* (2006.01)

(52) U.S. Cl.
CPC ............ *H04W 64/003* (2013.01); *G01S 3/48* (2013.01); *G01S 11/04* (2013.01); *H04W 4/80* (2018.02)

(58) Field of Classification Search
CPC ......... H04W 64/003; H04W 4/80; G01S 3/48; G01S 11/04
See application file for complete search history.

(56) References Cited

U.S. PATENT DOCUMENTS

| | | | |
|---|---|---|---|
| 8,559,982 B2* | 10/2013 | Wu | G01S 5/04 455/11.1 |
| 2009/0149202 A1* | 6/2009 | Hill | G01S 5/0289 455/456.6 |
| 2019/0033420 A1* | 1/2019 | Knaappila | G01S 3/143 |

\* cited by examiner

*Primary Examiner* — Julio R Perez
(74) *Attorney, Agent, or Firm* — Workman Nydegger

(57) ABSTRACT

Methods and systems for determining the location of a Bluetooth device using a standard broadcast packet containing known data. Multiple antennas are used to take measurements of the packet are converted into in-phase and quadrature components, then a low-pass filter is applied. The known data presents an in-phase and quadrature spectrum that is a continuous wave-tone representation of the packet signal in the passband of the low-pass filter. Multiple measurements are used to determine the phase difference of the filtered measurements at the different antenna locations. Phase difference is used to determine the location of the device.

19 Claims, 2 Drawing Sheets

ANGLE OF ARRIVAL AND DEPARTURE USING STANDARD BLUETOOTH LOW ENERGY PACKETS

BACKGROUND

There has been an increase in the need or desire to know or find the location of objects such as cell phones, keys, tablets, and other electronic devices. A common solution to this problem is to have the device transmit a continuous wave tone. When measured at two or more antennas, the tone allows for measurement of phase difference between the two antennas to determine the angle of arrival. This allows the device to be located.

A major problem is that the devices in question typically lack the hardware capability to transmit a continuous wave tone. While there are suggestions of modifying some communications standards, such as Bluetooth or Bluetooth Low Energy (BLE), to allow for the transmittal of continuous wave tones, this will require hardware and software upgrades. In many cases, continuous wave tone signals also violate Federal Communications Commission rules and regulations.

Further, in the case of Bluetooth and BLE, the signals make use of frequency modulation (FM) transmission, which have unpredictable phase. The signals are also whitened using a pseudo random pattern to help control the spectrum of the signal. While effectively spreading the signal spectrum, this also randomizes the phase of the transmitted signal. The combination of these features makes it very difficult to find the phase difference of the signal by simply measuring with multiple antennas. Simple phase difference routines lack the accuracy to determine the location of a device. There is a need for a method or system that can determine the location of a device using existing hardware in the device and existing communications protocols, such as Bluetooth or BLE.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Systems and methods for providing device location without modifying the hardware of the device or transmitting a continuous wave tone are presented.

Embodiments of the methods described herein provide for determining a location of a device using two or more antennas. A packet signal transmitted by the device is measured at each of the antennas. For at least one of the antennas, the packet signal is measured at a plurality of time instances. The signal is not a continuous wave tone, but, in some embodiments, is transmitted according to a communication protocol, such as Bluetooth or BLE. The packet in the packet signal is specially configured to contain at least a known data sequence, such as an alternating sequence of ones and zeros. Each of the measurements at each antenna is converted to in-phase and quadrature components.

These in-phase and quadrature components are then filtered using a low-pass filter. The structure of the known data sequence is such that the spectrum of the filtered signal in the pass band of the low-pass filter is identical to or an approximation of a continuous wave tone. The filtered signal thus provides a continuous wave tone representation of the measured signals. In some embodiments, these continuous wave tone representations allow for the phase of at least one of the measurements to be determined more readily or accurately.

The method continues by determining the phase of the packet signal at each antenna. For a first, reference antenna, this phase is determined directly. For each other antenna, the phase at the reference antenna is determined at a time before and after the measurement of the other antenna. These can then be used with the measurement of the phase at the other antenna to determine the phase at the other antenna. In at least some embodiments, this allows the phase to be accurately determined, even when the packet signal is not transmitted with a predictable phase, such as with FM signals used in Bluetooth or BLE systems.

Once the phase of the packet signal is determined at each antenna, these phase values can be used to determine the location of the device. Those skilled in the art will understand the various existing techniques that can be used to accomplish the calculation or determination of the location of the device using multiple receivers.

Further, embodiments of the method described above may be implemented in systems using processor(s) and computer-readable media.

This Summary is provided to introduce a selection of concepts in a simplified form that are further described below in the Detailed Description.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed, as well as systems for performing those methods and method acts. Although the method acts may be discussed in a certain order or illustrated in a flow chart as occurring in a particular order, no particular ordering is required unless specifically stated, or required because an act is dependent on another act being completed prior to the act being performed.

Figure 1:
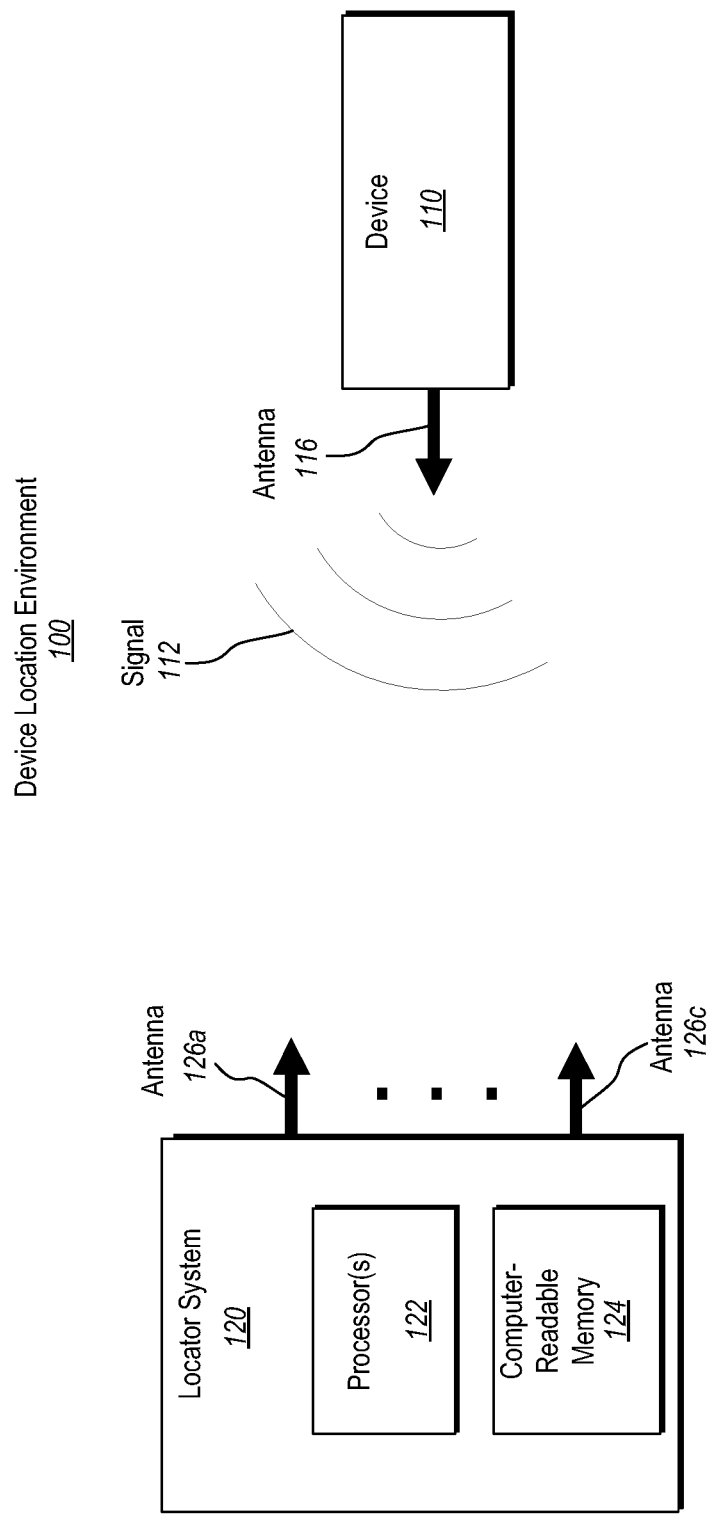
FIG. 1 illustrates a device location environment.

Referring now to FIG. 1, a device location environment 100 is illustrated. In the device location environment are found a device 110 and a device locator system 120.

The device 110 emits a signal 112 through an antenna 116. The device 110 can be any of variety of devices that are configured to communicate with other devices, such as a cell phone, tablet, keys, other mobile devices, or standard radios. In some embodiments, device 110 is configured to communicate using Bluetooth or Bluetooth Low Energy (BLE) protocols.

The antenna 116 is part of the device 110 and is configured for and used in communications with other devices, systems or networks. In some embodiments, the antenna is configured to allow for communications according to Bluetooth or BLE protocols. For example, in some embodiments, the antennas transmit generic access profile (GAP) or broadcast packets according to or as part of a Bluetooth or BLE communications scheme. In some embodiments, these GAP or broadcast packets are used to advertise the availability of services on the device 110. In some embodiments, the advertised services include applications on the device 110.

The signal 112 is a transmission from the device via the antenna, such as a radio frequency, frequency modulated (FM), Bluetooth, BLE, or other wireless transmission. In some embodiments, the signal results from the transmission of a packet. For example, in some embodiments, the signal results from transmitting a GAP or broadcast packet advertising a service on the device 110.

The locator system 120 has processor(s) 122, computer-readable memory 124, and two or more antennas, represented by antenna 126a and antenna 126c. Locator system 120 is configured or used to determine the location of device 110.

The processor(s) 122 are configured to execute instructions which are stored on the computer-readable media 124. In some embodiments, there are at least instructions stored on the computer-readable media 124 that, when executed by processor(s) 122, operate, command, or configure locator system 120 to determine the location of device 110.

For example, in some embodiments, when processor(s) 122 execute instructions stored on the computer-readable media 124, locator system 120 is commanded, configured, or operated in such a way that device 110 is located according to methods and flowcharts described herein, including those that are described below in relation to FIG. 2.

Antennas 126a and 126c are configured at least to measure signals, such as signal 112. In some embodiments, antenna 126a and antenna 126c are configured to measure Bluetooth or BLE signals or packets, such as GAP or broadcast packets.

In some embodiments, locator system 120 measures a signal 112 from device 110 at two or more antenna locations, such as the locations of antenna 126a and antenna 126c. In some embodiments, at least some of the two or more antennas are located at different positions on the actual locator system 120. In some embodiments, at least some of the two or more antennas are at locations separate from the actual locator system 120. In some embodiments, the two or more antennas are located both on the actual locator system 120 and at locations separate from the actual locator system 120.

Locator system 120 determines the phase of the signal at each antenna and uses trigonometric relationships and/or signal processing techniques to determine or calculate the location of device 110 based on the phases of the signal and the locations of the antennas. In such embodiments, the location of the two or more antennas are known with respect to each other and/or the locator system 120 such that such trigonometric relationships and/or signal processing techniques can be applied.

In some embodiments, locator system 120 improves over existing approaches by not requiring the transmission of a continuous wave tone from device 110. Instead, the locator system 120 only relies on the non-continuous wave tone GAP or broadcast packet transmission that is made as a standard part of Bluetooth or BLE communications or services. This allows the locator system 120 to interact with device 110 without requiring modification or retroactive changes to device 110's hardware configuration or transmission capabilities.

For example, an application can be installed on device 110 that broadcasts a service advertisement of the application according to standard Bluetooth or BLE protocols. The application provides a specific data message as its advertisement for transmission in the GAP or broadcast packet. The specific data message is configured such that when it is formatted or processed for inclusion in the GAP or broadcast packet, the resulting GAP or broadcast packet has a predetermined sequence or message in at least a portion of its packet contents. The predetermined sequence or message is at least used by the locator system 120 in determining the phase of the signal 112 as measured at the antennas. Further description of how this occurs is described below in relation to methods of the flowchart in FIG. 2.

Figure 2:
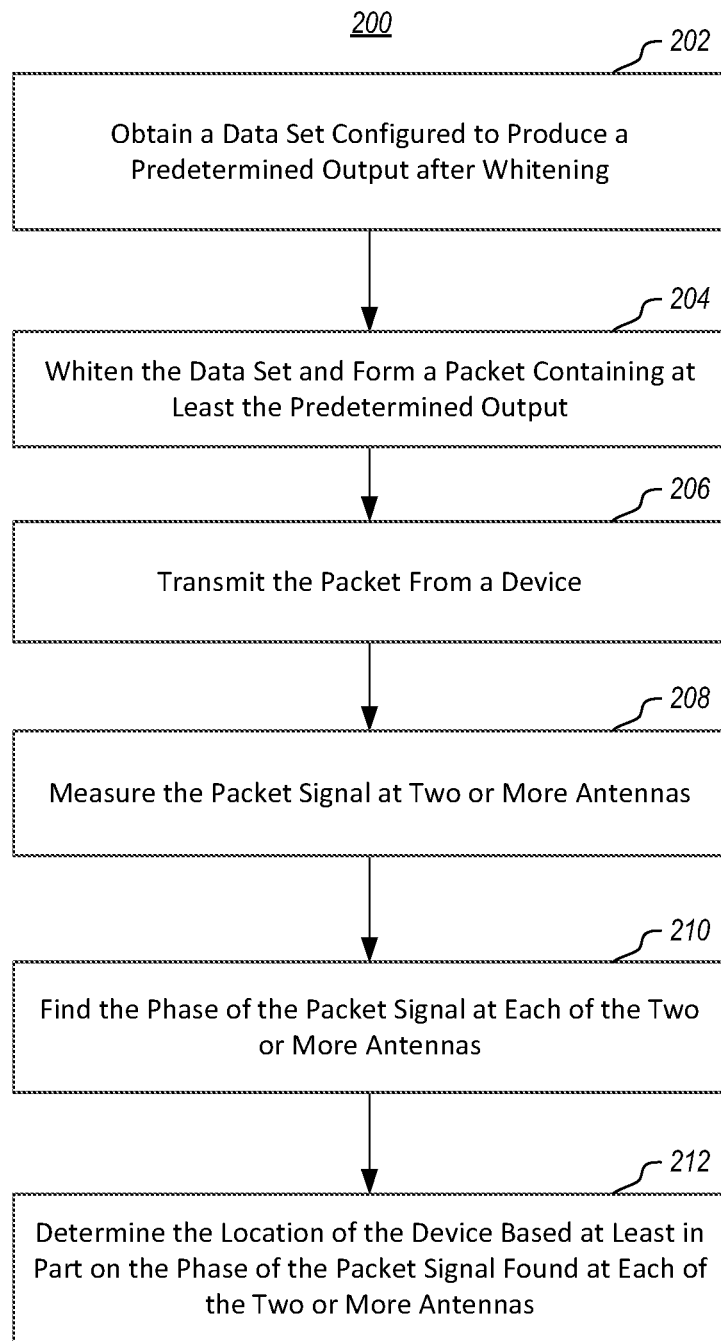
FIG. 2 illustrates a flowchart for methods of locating a device.

FIG. 2 depicts a flowchart 200 for embodiments of methods for practicing device location as disclosed herein. Embodiments of the methods following flowchart 200 are, in some instances, implemented on systems and devices, such as locator system 120 and device 110. It will be appreciated that, while the flowchart 200 includes an end-to-end method or process that is practiced both on a device, such as device 110, and a locating system, such as locator system 120, embodiments of methods following flowchart 200 can practice some or all of the steps or acts.

The first act shown in flowchart 200 is obtaining a data set configured to produce a predetermined output after whitening (act 202). Obtaining the data set is accessing, generating, calculating, or otherwise determining the data set.

In some embodiments, the data set is a specific data message. The specific data message is a group or sequence of bits or symbols. In some embodiments, the bits or symbols in the specific data message have been run through a whitening process or filter. For example, in some embodiments, the specific data message is a sequence of alternating ones and zeros (e.g., 1 0 1 0 1 0 etc., or 0 1 0 1 0 1 etc.) that has been previously passed through a whitening filter or process. In some embodiments, this has the effect of randomizing or pseudo-randomizing the order of the ones and zeros.

In some embodiments, the data set being configured to produce a predetermined output after whitening is achieved by whitening the data set using a first whitening filter or process. In some embodiments, obtaining the data set includes filtering or processing an alternating sequence of ones and zeros through the first whitening filter or process. This whitening step is different or separate from a whitening step that produces a predetermined output, as described below in act 204.

In some embodiments, the first whitening filter or process is the inverse of a second whitening filter or process, in the sense that the first and second whitening filters or processes produce reciprocal results or undo the filtering or processing performed by each other. For example, if the data having a first order or sequence is run through the first whitening filter or process, a second order or sequence is achieved. The filters or processes are inverse in that if the data with the second order is then run through the second whitening filter or process, the output data has the first order. In some embodiments, the second whitening filter or process is a standard whitening filter or process used in preparing data for transmission in packets according to a Bluetooth or BLE standard protocol and the first whitening filter or process is the inverse of the standard whitening filter or process.

Next, flowchart 200 includes whitening the data set and forming a packet containing at least the predetermined output (act 204). Whitening the data involves running the data through a whitening filter or process, which creates or results in a predetermined output.

The predetermined output is a group or sequence of bits or symbols that is expected or known by the locator system 120. In some embodiments, the group or sequence of bits is achieved by running the specific data message through the standard whitening filter or process that is part of the process for preparing the specific data message for a GAP or broadcast packet as part of the Bluetooth or BLE standard protocol. In some embodiments, this is a sequence of alternating ones and zeros (e.g., 1 0 1 0 1 0 etc., or 0 1 0 1 0 1 etc.). In some of these embodiments, the sequence of alternating ones and zeros is achieved because the contents of the specific data message were previously passed through a first whitening filter or process that is the inverse of the standard whitening filter or process, as discussed above for act 202.

In some embodiments, the predetermined output is substantially a sequence of alternating ones and zeros, in that the sequence is mostly a sequence of alternating ones and zeros, but there are some bits that are flipped from what would be expected in a sequence of alternating ones and zeros.

For example, if a sequence of ten alternating ones and zeros were 1 0 1 0 1 0 1 0 1 0, a substantially alternating sequence of ones and zeros could be 1 0 1 0 1 1 1 0 1 0, where a single bit has been flipped. In this example provided, since only one of the ten bits is flipped, the sequence is 90% (nine bits correct over ten total bits compared to a sequence of 1 0 1 0 1 0 1 0 1 0) alternating ones and zeros.

In some embodiments, the predetermined output is at least 70% alternating ones and zeros. In some embodiments, the predetermined output is at least 80% alternating ones and zeros. In some embodiments, the predetermined output is at least 90% alternating ones and zeros. In some embodiments, the predetermined output is at least 95% alternating ones and zeros. In some embodiments, the predetermined output is at least 99% alternating ones and zeros.

It will be appreciated that, for alternating sequences such as those described above, reference sequences of 1 0 1 0 1 0 1 0 1 0 or 0 1 0 1 0 1 0 1 0 1 are both acceptable for comparison with a substantially predetermined sequence. For instance, the example above showing 90% (nine bits correct over ten total bits compared to a sequence of 1 0 1 0 1 0 1 0 1 0) alternating ones and zeros could also be 10% (one bit correct over ten total bits compared to a sequence of 0 1 0 1 0 1 0 1 0 1) alternating ones and zeros, depending on which sequence is used as a reference. Any sequence of substantially alternating ones and zeros should be considered from the perspective that yields the larger percentage. In other words, the sequence can be compared to either reference sequence and evaluated against the reference sequence that maximizes the percentage of alternating ones and zeros. For instance, the example discussed above would be categorized as a 90% alternating sequence of ones and zeros, rather than a 10% alternating sequence of ones and zeros.

Once the predetermine sequence is found, a packet is formed containing the predetermined sequence. Forming a packet containing at least the predetermined output involves forming a packet configured according to a protocol. In some embodiments, the protocol is a Bluetooth or BLE protocol for GAP or broadcast packets. In some embodiments, the packet is just the predetermined output.

Next, the flowchart 200 includes transmitting the packet from a device (act 206). Transmitting the packet includes sending a signal such as signal 112 described in FIG. 1 (above). In some embodiments, the device is device 110 as discussed above. In some embodiments, transmitting the packet is performed by the device 110 via antenna 116, depicted in FIG. 1.

The packet is transmitted according to a protocol. For example, in some embodiments, the packet is transmitted according to the Bluetooth or BLE standard or protocol.

Next, the flowchart 200 includes measuring the packet signal at two or more antennas (act 208). Measuring the packet signal requires detecting a signal containing the packet and measuring that signal. In some embodiments, measuring the signal also includes sampling the measurements.

In some embodiments, the packet signal is a signal 112, as described above in FIG. 1.

In some embodiments, the two or more antennas are three antennas. In some embodiments, the two or more antennas are at least three antennas. In some embodiments, the two or more antennas are the two or more antennas depicted in FIG. 1 and represented by antenna 126a and antenna 126c.

In some embodiments, measuring the packet signal at each of the two or more antennas occurs over a period of time. In some embodiments, measuring the packet signal at each of the two or more antennas is performed at least at a different time for each antenna. In some embodiments, the packet signal is measured for at least one antenna of the two or more antennas at two or more times.

In some embodiments, one or more antennas are reference antennas. The reference antennas are used as a phase reference for the other, non-reference antennas. For example, in some embodiments, antenna 126a is a reference antenna and antenna 126c is a non-reference or other antenna. When calculating or determining the phase of the packet signal at antenna 126c, one or more measurements of the packet signal at the reference antenna (antenna 126a) are used as part of the calculation or determination of the phase of antenna 126c. In some such embodiments, measurements of the packet signal are made at antenna 126a at a first time and a third time, while measurement of the packet signal is made at antenna 126c at a second time, which is between the first and third times.

Next, flowchart 200 includes finding the phase of the packet signal at each of the two or more antennas (act 210). Finding the phase involves measuring, calculating, estimating, or otherwise determining the phase of the measured packet signal at each of the antennas.

In some embodiments, finding the phase includes obtaining, measuring, finding, or calculating the in-phase and quadrature (IQ) components or data for the measurements. The IQ components or data for at least the portion of the packet signal containing the predetermined output is then passed through a low-pass filter. Across the passband of the low-pass filter, the IQ components or data of the predetermined output are continuous wave tone or a representation of a continuous wave tone. The filtered signal can then be used as a continuous wave tone or continuous wave tone representation and the phase of the packet signal can be found, calculated, generated, or measured.

For a non-reference or other antenna, the determined phase is an uncorrected phase that must be corrected. In some embodiments, the phase is uncorrected because of the FM transmission scheme used, which introduces unpredictable elements into the phase, as discussed above. After measuring, finding, generating, or calculating this uncorrected phase of the packet signal, it is then corrected using one or more phase measurements from a reference antenna. For example, in some embodiments, the two or more antennas include a first and second antenna. The first antenna is a reference antenna, as discussed above. When the packet signal is measured at the first antenna, the phase of the measured packet signal is found at a first time. This is the first reference phase.

For the second antenna, the uncorrected phase of the measured packet signal is found at a second time after the first time. Additionally, a second measurement of the packet signal at the reference antenna is made at a third time after the second time. The phase for this second measurement of the packet signal is also found. This is the second reference phase.

The uncorrected phase of the measured packet signal at the second antenna is then corrected using the first and second reference phases to find the corrected phase of the measured packet signal at the second antenna.

In some embodiments, a single antenna is the reference antenna for all other antennas. For example, in an embodiment with three antennas, a first antenna may be the reference antenna for both a second and third antenna. In some such embodiments, the first, second and third times used in the correction of the uncorrected phase for the second antenna are different than the first, second, and third times used in correction of the uncorrected phase of the third antenna. In some embodiments, at least some of the first, second and third times are the same for different antennas.

In other embodiments, a different antenna may be used as a reference antenna depending on the antenna whose uncorrected phase is being corrected. For example, in an embodiment with three antennas, the first antenna may be a reference for the second antenna, as discussed above. However, the second antenna is then used as the reference antenna for the third antenna. In some such embodiments, the first, second and third times used in the correction of the uncorrected phase for the second antenna are different than the first, second, and third times used in correction of the uncorrected phase of the third antenna. In some embodiments, some of the times are the same.

In some embodiments, the phase of the other antenna is corrected by using the phase of the reference antenna at the first and third times together with the uncorrected phase at the second time to determine a frequency drift of the packet signal between the reference and other antenna across the first, second, and third times. In some embodiments, at least the frequency drift is then used to correct the uncorrected phase.

In some embodiments, the phase of the other antenna is corrected by using the phase of the reference antenna at the first and third times together with the uncorrected phase at the second time to determine a phase error of the packet signal between the reference and other antenna across the first, second, and third times. In some embodiments, at least the phase error is then used to correct the uncorrected phase.

In some embodiments, this allows for accurate calculation of phase of a packet signal at an antenna or phase difference between measurements of a packet signal at different antennas without requiring any phase performance at the transmit antenna of a device, such as antenna 116 of device 110.

In some embodiments the methods described by flowchart 200 advantageously avoid problems with phase error or frequency drift without needing to transmit a continuous wave signal. For example, in embodiments using Bluetooth or BLE communications, the transmissions are frequency modulated, presenting potential problems with frequency drift or phase error. The low-pass filtered IQ components or data are treated as a continuous wave tone or continuous wave tone representation in the passband of the low-pass filter, which avoids many of those problems or allows them to be corrected as described above. However, such embodiments of this method do not need to actually transmit a continuous wave tone, which in some devices is difficult or impossible without hardware modifications.

Next, flowchart 200 includes determining the location of the device based at least in part on the phase of the packet signal measured at each of the two or more antennas (act 212). In some embodiments, signal processing techniques take as an input the phase of the packet signal at each of the two or more antennas as an input and output a location of the device. In some embodiments, trigonometric identities or relationships are used to determine the location of the device based on the phases of the packet signal at each of the two or more antennas. In some embodiments, both trigonometric identities or relationships and signal processing techniques are used together to determine the location of the device based on the phase of the packet signal at each of the two or more antennas.

In some embodiments, the location of each antenna of the two or more antennas is also used in determining the location of the device. In some such embodiments, determining the location of the device further includes obtaining, determining, accessing, or otherwise finding the location of each antenna of the two or more antennas.

The methods disclosed herein, such as methods according to flowchart 200, may be practiced by a computer system including one or more processors and computer-readable media such as computer memory. In particular, the computer memory may store computer-executable instructions that when executed by one or more processors cause various functions to be performed, such as the acts recited in the embodiments. For example, in some embodiments, the computer system is a locator system 120 as discussed above.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A locator system for determining a location of a device transmitting a packet signal comprising at least an expected data sequence, the locator system comprising:
   two or more antennas, one or more processors;
   and one or more computer-readable media having stored thereon instructions that are executable by the one or more processors to configure the locator system to determine the location of a device, including instructions that are executable to configure the computer system to perform at least the following:
   for a reference antenna of the two or more antennas,
   measure the packet signal at the reference antenna to obtain a reference measurement measured at a reference time,
   determine a reference in-phase component and a reference quadrature component for the reference measurement,
   apply a low-pass filter to the reference in-phase component and the reference quadrature component to obtain a reference continuous wave tone representation,
   determine a reference phase of the reference measurement using the reference continuous wave tone representation;
   for each other antenna of the two or more antennas,
   measure the packet signal at the each other antenna at a second time to obtain a second measurement and measure the reference antenna at a first time to obtain a first measurement and a third time to obtain a third measurement, where the second time is after the first time and before the third time,
   determine a first in-phase component and a first quadrature component for the first measurement, a second in-phase component and a second quadrature component for the second measurement, and a third in-phase component and a third quadrature component for the third measurement,
   apply the low-pass filter to the first in-phase component and the first quadrature component to obtain a first continuous wave tone representation, to the second in-phase component and the second quadrature component to obtain a second continuous wave tone representation, and to the third in-phase component and the third quadrature component to obtain a third continuous wave tone representation, determine a first phase of the first measurement using the first continuous wave tone representation, an uncorrected phase of the second measurement using the second continuous wave tone representation, and a third phase of the third measurement using the third continuous wave tone representation,
   determine a corrected phase of the second measurement using the first phase, the uncorrected phase, and the third phase;
   and determine the location of the device using at least the corrected phase of the each other antennas and the reference phase of the reference antenna.

2. The locator system of claim 1, wherein the expected data sequence is an alternating sequence of ones and zeros.

3. The locator system of claim 1, wherein the two or more antennas are at least three antennas.

4. The locator system of claim 1, wherein the reference continuous wave tone representation, the first continuous wave tone representation, the second continuous wave tone representation, and the third continuous wave tone representation all have the spectrum of a continuous wave tone at least in the passband of the low-pass filter.

5. The locator system of claim 1, wherein:
   a location of each antenna of the two or more antennas is known;
   determining the location of the device further comprises using at least the location of each antenna of the two or more antennas; and
   wherein the one or more computer-readable media further have stored thereon instructions that are executable by the one or more processors to configure the locator system to perform at least the following:
   obtain the location of each antenna of the two or more antennas.

6. The locator system of claim 1, wherein the packet signal is a packet transmitted by the device according to a Bluetooth Low Energy protocol.

7. The locator system of claim 1, wherein determining the corrected phase of the second measurement using the first phase, the uncorrected phase, and the third phase comprises at least using the first phase, the uncorrected phase, and the third phase to determine at least one of frequency drift or phase error between the reference antenna and the each other antenna of the two or more antennas for which the uncorrected phase is being corrected.

8. A method for determining a location of a device transmitting a packet signal comprising at least an expected data sequence, the method comprising:
   for a reference antenna of two or more antennas,
   measuring the packet signal at the reference antenna to obtain a reference measurement measured at a reference time, determining a reference in-phase component and a reference quadrature component for the reference measurement, applying a low-pass filter to the reference in-phase component and the reference quadrature component to obtain a reference continuous wave tone representation, determining a reference phase of the reference measurement using the reference continuous wave tone representation;

for each other antenna of the two or more antennas, measuring the packet signal at the each other antenna at a second time to obtain a second measurement and measure the reference antenna at a first time to obtain a first measurement and a third time to obtain a third measurement, where the second time is after the first time and before the third time, determining a first in-phase component and a first quadrature component for the first measurement, a second in-phase component and a second quadrature component for the second measurement, and a third in-phase component and a third quadrature component for the third measurement, applying the low-pass filter to the first in-phase component and the first quadrature component to obtain a first continuous wave tone representation, to the second in-phase component and the second quadrature component to obtain a second continuous wave tone representation, and to the third in-phase component and the third quadrature component to obtain a third continuous wave tone representation, determining a first phase of the first measurement using the first continuous wave tone representation, an uncorrected phase of the second measurement using the second continuous wave tone representation, and a third phase of the third measurement using the third continuous wave tone representation, determining a corrected phase of the second measurement using the first phase, the uncorrected phase, and the third phase;

and determining the location of the device using at least the corrected phase of the each other antennas and the reference phase of the reference antenna.

9. The method of claim 8, wherein the expected data sequence is an alternating sequence of ones and zeros.

10. The method of claim 8, wherein the two or more antennas are at least three antennas.

11. The method of claim 8, wherein the reference continuous wave tone representation, the first continuous wave tone representation, the second continuous wave tone representation, and the third continuous wave tone representation all have the spectrum of a continuous wave tone at least in the passband of the low-pass filter.

12. The method of claim 8, wherein:

a location of each antenna of the two or more antennas is known;

determining the location of the device further comprises using at least the location of each antenna of the two or more antennas.

13. The method of claim 8, wherein the packet signal is a packet transmitted by the device according to a Bluetooth Low Energy protocol.

14. The method of claim 8, wherein determining the corrected phase of the second measurement using the first phase, the uncorrected phase, and the third phase comprises at least using the first phase, the uncorrected phase, and the third phase to determine at least one of frequency drift or phase error between the reference antenna and the each other antenna of the two or more antennas for which the uncorrected phase is being corrected.

15. A method for determining a location of a device, the method comprising:

measuring at two or more antennas a packet signal of a packet transmitted from the device, the packet comprising at least a known data sequence;

determining for each antenna of the two or more antennas an in-phase component and a quadrature component for at least one measurement of the packet signal as measured at the antenna;

applying a low-pass filter to the in-phase component and the quadrature component for the at least one measurement of the packet signal to obtain a continuous wave tone representation for each of the at least one measurement of the packet signal, wherein the continuous wave tone representation for each of the at least one measurement of the packet signal has the spectrum of a continuous wave tone in at least the passband of the low-pass filter;

determining a phase of the packet signal at each antenna of the two or more antennas using at least the continuous wave tone representation of the at least one measurement of the packet signal at the antenna;

determining the location of the device using at least the phase of the packet signal at each antenna.

16. The method of claim 15, wherein the known data sequence is a sequence of alternating ones and zeros.

17. The method of claim 15, wherein the two or more antennas are at least three antennas.

18. The method of claim 15, wherein a location for each antenna of the two or more antennas is known and determining the location of the device further comprises using at least the location of each antenna of the two or more antennas.

19. The method of claim 15, wherein the packet signal is a packet transmitted by the device according to a Bluetooth Low Energy protocol.

* * * * *